D. HALDEMAN.
Seed-Planter.
No. 9,296.
Patented Oct. 5, 1852.
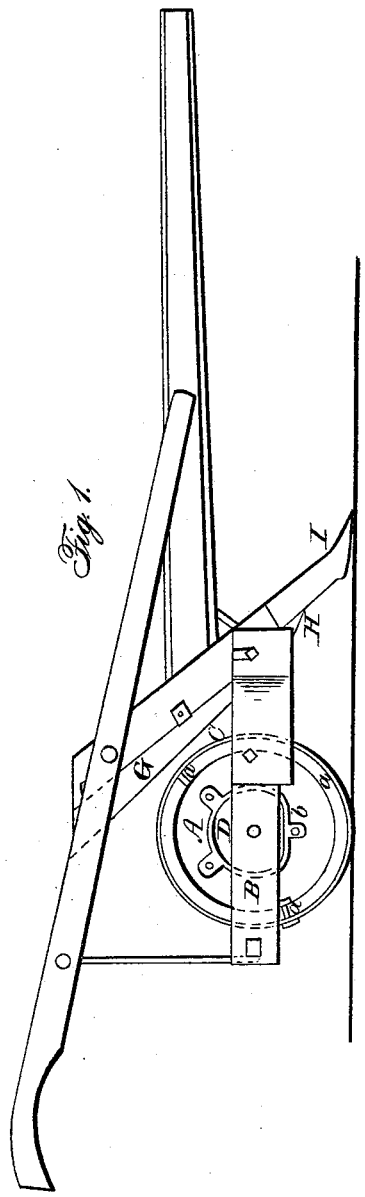
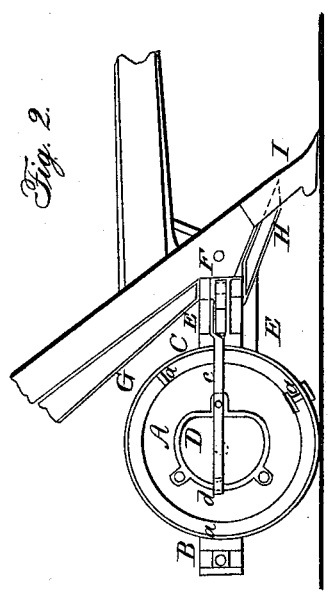
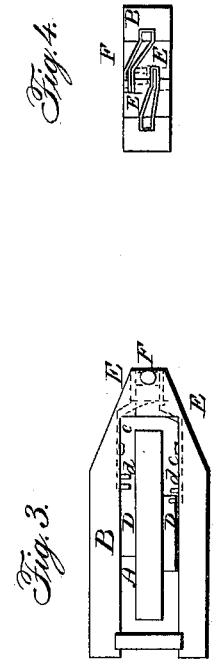

UNITED STATES PATENT OFFICE.

D. HALDEMAN, OF MORGANTOWN, VIRGINIA.

IMPROVEMENT IN SEED-PLANTERS.

Specification forming part of Letters Patent No. 9,296, dated October 5, 1852.

*To all whom it may concern:*

Be it known that I, D. HALDEMAN, of Morgantown, in the county of Monongalia and State of Virginia, have invented certain new and useful Improvements in Machines for Planting Seed; and I do hereby declare that the following is a full, clear, and exact description of the construction and operation of the same, reference being had to the annexed drawings, making a part of this specification, in which—

Figure 1 is a side elevation of the machine. Fig. 2 is a side view of the wheel or roller, showing one of the cams, and also one of the slides, the iron plate, and tubes through which the seed passes into the furrow. Fig. 3 is a detached plan, showing the wheel or roller with the cams attached, the slides and iron plates being represented by dotted lines. Fig. 4 is a front view of the slides, showing the manner in which they work over the iron plate.

Similar letters of reference indicate corresponding parts in each of the several figures.

The nature of my invention consists in having the wheel or roller encompassed by one or more tires, which may be adjusted to the wheel or roller at pleasure, thus increasing or diminishing the diameter of the wheel and allowing the seed to be planted the required distance apart, as will be hereinafter shown.

To enable others skilled in the art to make and use my invention, I will proceed to describe its construction and operation.

A represents the wheel or roller, placed within suitable frame, B.

C represents a tire placed around the wheel and adjusted to it by set-screws a, Figs. 1 and 2. These screws, by being relaxed, allow the tire to be removed. There may be one or more tires, as desired, every tire that is added increasing the diameter of the wheel. For instance, if the diameter of the wheel A be three feet and the outer surface of the tire C be three inches from the periphery of the wheel, the diameter of the wheel will be increased six inches by employing the tire. The object of employing the adjustable tire or tires will presently be shown.

D D are two cams, one on each side of the wheel A. These cams are secured to the wheel in any proper way. Their shape will be seen and understood perfectly by referring to Figs. 1 and 2. They may be described as being D-shaped, or a circle with a segment cut off. The cams, however, may vary somewhat in shape from those represented and effect the same object. The cams are reversed—that is, if the flat surface b of one cam is nearest the beam or front of the implement the flat surface of the other cam will be in an opposite position, or the farthest point off from the beam or front of the implement. (See Fig. 3.)

E E are two slides, which are operated by the cams. These slides have shanks c c, with projections d at their ends, between which the edges of the cams fit. (See Fig. 3.) At the opposite ends of the shanks are the slides, which are flat square plates working in slots in the front part of the frame B. Both slides are curved or bent, one upward and the other downward. (See Fig. 4.) This allows a space between, in which a metal plate, F, is fitted, (see Fig. 2 and dotted lines in Fig. 4,) the plate F being fitted in a mortise. This plate has a hole or aperture through it of sufficient size to allow seed to pass through (see dotted lines) in line with the aperture. Through the plate are holes in the frame, both above and below the plate. (See Fig. 2.) A tube, G, communicates with the top hole, and a tube, H, with the lower hole. (See Figs. 1 and 2.) The upper tube, G, contains the seed, while the lower tube, H, conveys it to a recess in the share I, and it falls into the furrows made by the share as the implement is drawn or moved.

The operation of the slides E E will now be shown. The slides have a reciprocating motion given them by the cams, as will be readily seen, and as the cams are attached to the wheel relatively in a reverse position, of course one slide will be thrown forward while the other is drawn back. Now, the slides work in slots, one directly over and the other immediately underneath the metal plate F, so that when the upper slide is drawn back the seed will pass from the tube G and fall into the aperture in the metal plate F, the aperture being closed at the bottom by the under slide, which is thrown forward, and when the under slide is drawn back the seed passes from the aperture and falls into the tube H and is conveyed into the furrow, the upper slide being thrown forward and covering the aperture in the plate F at the top while the lower slide is drawn back. Thus the slides E E have a reciprocating motion working alternately, allowing no waste of seed, and distributing the seed in an even and sure manner.

The object in using the adjustable tire or tires is that the larger the diameter of the wheel A is the slower the slides operate. Consequently, where it is desired to have the seed dropped three feet apart the wheel must be three feet in circumference or one foot in diameter. Now, by adding the tires the space between the hills where seed will be deposited will be increased according as the diameter of the wheel is enlarged. Thus by having a series of tires they may be adjusted to the wheel so that the seed may be planted at any reasonable distance apart.

Having thus described the nature and operation of my invention, what I claim as new, and desire to secure by Letters Patent, is—

The employment or use of the adjustable tire or tires for the purpose of varying the diameter of the wheel A to allow the seed to be deposited the required distance apart.

D. HALDEMAN.

Witnesses:
   J. E. TUCKER,
   S. PICKENPAUGH.